P. J. AND W. E. MALONEY.
BREAD TOASTER.
APPLICATION FILED OCT. 17, 1917.
1,363,527. Patented Dec. 28, 1920.
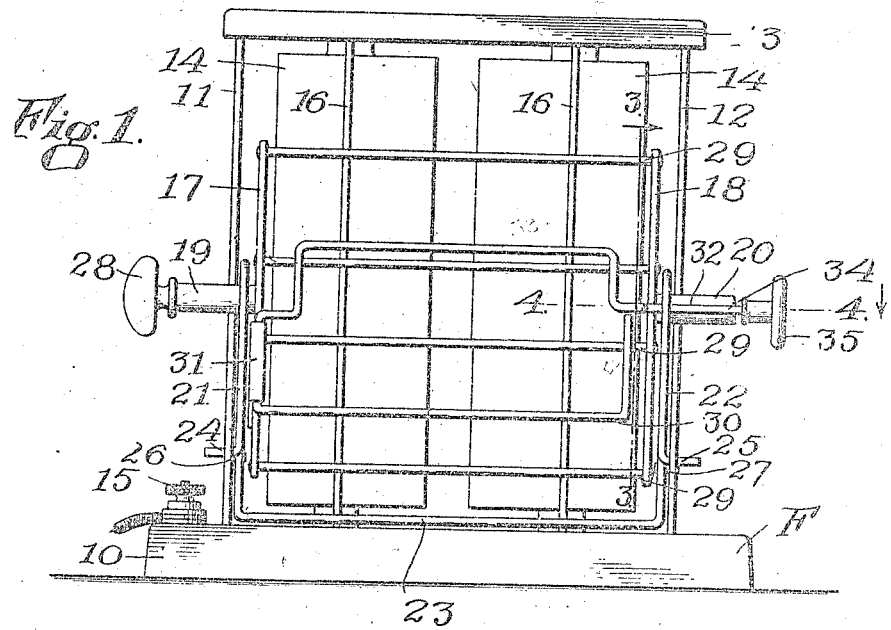
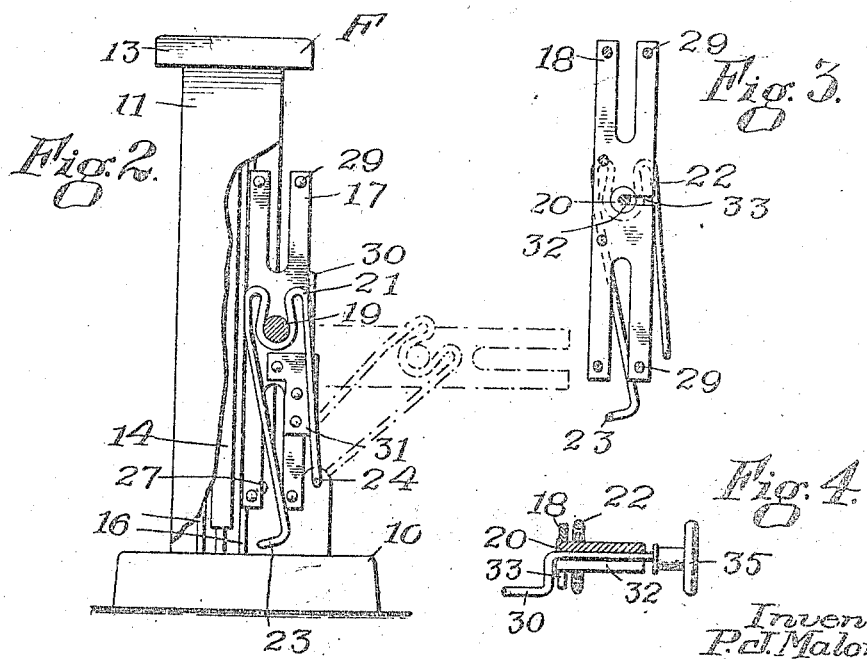
Inventors.
P. J. Maloney.
W. E. Maloney.
By Attorneys.

UNITED STATES PATENT OFFICE.

PETER J. MALONEY AND WILLIAM E. MALONEY, OF WORCESTER, MASSACHUSETTS.

BREAD-TOASTER.

1,363,527.

Specification of Letters Patent.   Patented Dec. 28, 1920.

Application filed October 17, 1917.   Serial No. 197,154.

*To all whom it may concern:*

Be it known that we, PETER J. MALONEY and WILLIAM E. MALONEY, citizens of the United States, residing at Worcester, in the county of Worcester and State of Massachusetts, have invented a new and useful Bread-Toaster, of which the following is a specification.

This invention relates to a toaster for table use, designed for toasting bread, crackers, or other similar articles of food.

The term bread as hereinafter used will be understood to include all materials of similar nature without further specific reference thereto.

It is the general object of our invention to provide an improved toaster of the type in which both sides of a slice of bread may be successively toasted without changing the position of the slice in its support or carrier.

With this general object in view, one feature of our invention relates to the provision of a rotatable bread carrier supported for movement toward and from the heating elements, and also independently rotatable about its own axis to reverse its toasting position.

Another feature of our invention relates to the provision of means for holding the slice of bread in the carrier, and particularly to devices for locking said holding means when the carrier is in operative position.

Other features of our invention relate to means for supporting the carrier in convenient inoperative position for inserting and removing the bread, and further relate to certain arrangements and combinations of parts which will be hereinafter described and more particularly pointed out in the appended claims.

A preferred form of our invention is shown in the drawings, in which—

Figure 1 is a front elevation of our improved toaster;

Fig. 2 is a left-hand end elevation thereof;

Fig. 3 is a detail sectional elevation taken along the line 3—3 in Fig. 1, and

Fig. 4 is a detail plan view taken along the line 4—4 in Fig. 1.

Referring to the drawings, our improved toaster comprises a frame F having a base 10, side portions 11 and 12, and a top portion 13. Heating elements 14 of any usual form are supported in the frame F and are suitably connected to terminals 15. Parallel vertical rods 16 are secured in the base 10 and top 13 on each side of the heating elements and prevent contact of the bread carrier therewith.

The bread carrier comprises suitably connected end plates 17 and 18 to which are secured bearing studs 19 and 20. These studs rest in bearings shown herein as formed in a bent wire frame or support comprising supporting arms 21 and 22 and a connecting portion 23. The arms 21 and 22 are pivoted at 24 and 25 respectively to the end frame members 11 and 12. The bearings for the studs 19 ad 20 are preferably formed by bending the wire as shown in Fig. 2, thus providing bearings for the studs, and preventing accidental displacement thereof.

The lower connecting portion 23 of the wire support is offset rearwardly as shown in Fig. 2, and is adapted to engage stop pins 26 and 27 when the support is swung outwardly, thus holding the support and carrier in convenient position for the loading or reversal of the carrier. The stud 19 is provided with a handle or knob 28 by which the carrier can be conveniently moved outward or reversed.

The plates 17 and 18 are connected by a plurality of wires 29 which complete a rectangular framework within which the bread is supported. After the bread is inserted within the carrier it is retained therein by a swinging retaining member 30 hinged at 31 to the carrier side 17.

The stud 20 is provided with a longitudinal groove 32, as shown in Fig. 3, and the side plate 18 is provided with a notch 33 communicating with the groove 32. The openings 32 and 33 are adapted to receive an extension 34 of the retaining member 30, said extension being provided with a handle 35 at its outer end. With this construction it will be noted that the extension 34 of the retaining member 30 is locked within the groove 32 by the support 23 whenever the bread carrier is in operative position. Furthermore the gate member 30 is released whenever the carrier is swung outwardly and moved to loading position with the groove 32 and notch 33 in alinement with the open end of the swinging support.

Having described the details of construction of our invention, it will be seen that we have provided an extremely simple device by the use of which a slice of bread or other similar material may be conveniently toasted successively upon its two sides without handling the material during the toasting operation.

The supporting frame is first swung outward and the carrier is next turned to substantially horizontal position. The retainer 30 is then free to be swung upwardly to permit insertion of the bread or other material to be toasted, after which the retainer 30 may be returned to operative position with its extension 34 fitting in the groove 32. As the parts are swung back to the operative position shown in Fig. 2, the groove 32 is closed by a side of the portion 22 of the swinging support and the bread is thus securely held within the carrier. After the toasting has been completed upon one side, the carrier is swung outward upon its supporting arms and is thereafter given a semi-revolution by means of the knob 28. The carrier is then swung inward again upon its supports 21 and 22, and the toasting of the second side follows.

It will be understood that the toaster is commonly made with the movable carriers in duplicate and exposed on each side of the heating elements.

Having thus described our invention, it will be evident that changes and modifications can be made therein by those skilled in the art without departing from the spirit and scope of our invention as expressed in the claims, and we do not wish to be otherwise limited to the details herein disclosed, but what we claim is—

1. A bread toaster having, in combination, a frame, heating elements mounted therein, and means to support the bread in proximity to said elements, said supporting means comprising a pair of arms connected to move in unison and pivoted to opposite sides of said frame, bearings in said arms, and a bread carrier supported by and angularly movable in said bearings, one of said bearings having an open side, and said carrier having a bread retaining member with a portion thereof movable outwardly through the open side of said bearing when the carrier is in a definite angular position relatively to said arm.

2. A bread toaster having, in combination, a frame open at the sides and comprising base, end, and top portions, heating elements vertically disposed therein, a pair of arms pivoted to the ends of said frame near the outer lower corners thereof and connected to move together, said arms having horizontal bearing portions at their upper ends, a bread carrier provided with bearing portions coöperating therewith and supporting said carrier on said arms for angular movement about a horizontal axis, and means to position said carrier adjacent but spaced from said heating elements and with its axis nearer to said elements than the pivot of its supporting arms, whereby said carrier is held by gravity in vertical operative position adjacent said heating elements.

3. A bread toaster having, in combination, a frame open at the sides and comprising base, end, and top portions, heating elements vertically disposed therein, a pair of arms pivoted to the ends of said frame near the outer lower corners thereof, and connected to move together, said arms having bearings in their upper ends, a reversible bread carrier mounted for angular movement on said bearings, and stops to position said carrier adjacent but spaced from said heating elements and also to position said carrier when swung outward to a position for reversal remote from said heating elements.

In testimony whereof we have hereunto affixed our signatures.

PETER J. MALONEY.
WILLIAM E. MALONEY.